United States Patent [19]
Mano et al.

[11] Patent Number: 5,512,195
[45] Date of Patent: Apr. 30, 1996

[54] PROCESS FOR PRODUCING SINGLE PHASE MAGNETITE POWDER

[75] Inventors: Yasuhiko Mano, Toyohashi; Takeshi Mochizuki, Shizuoka; Isamu Sasaki; Akira Shimokawa, both of Kosai, all of Japan

[73] Assignee: Fuji Electrochemical Co. Ltd., Tokyo, Japan

[21] Appl. No.: 313,152

[22] PCT Filed: Mar. 31, 1994

[86] PCT No.: PCT/JP94/00531

§ 371 Date: Oct. 3, 1994

§ 102(e) Date: Oct. 3, 1994

[87] PCT Pub. No.: WO94/27911

PCT Pub. Date: Dec. 18, 1994

[30] Foreign Application Priority Data

May 20, 1993 [JP] Japan ................... 5-141473
May 20, 1993 [JP] Japan ................... 5-141474
Aug. 31, 1993 [JP] Japan ................... 5-215872

[51] Int. Cl.$^6$ ............................. C01G 49/08; C01G 49/06
[52] U.S. Cl. .................................... 252/62.56; 423/632
[58] Field of Search ................. 252/62.56; 423/632

[56] References Cited

U.S. PATENT DOCUMENTS 3,929,657  12/1975  Jones ................................. 252/62.1
4,305,921  12/1981  Umeki ............................... 252/62.56
4,311,684   1/1982  Umeki ................................ 423/632

FOREIGN PATENT DOCUMENTS 49-8496     1/1974   Japan .
51-110308   9/1976   Japan .
55-23218    6/1980   Japan .
55-22005    6/1980   Japan .
62-37782    8/1987   Japan .
62-238580  10/1987   Japan .
2-39498     9/1990   Japan .
2-51505    11/1990   Japan .

*Primary Examiner*—Melissa Bonner
*Attorney, Agent, or Firm*—Keck, Mahin & Cate

[57] ABSTRACT

Hematite powder is mixed with a substance having a carbon-to-carbon single or double bond, and sintered in an inert gas to form magnetite powder. The magnetite powder can be provided with a desired electric resistance while retaining the properties characteristic of the magnetite powder by effecting a heating in an oxygenic atmosphere after the formation of the magnetite powder (or during a cooling subsequent to the sintering in the inert gas).

5 Claims, 2 Drawing Sheets

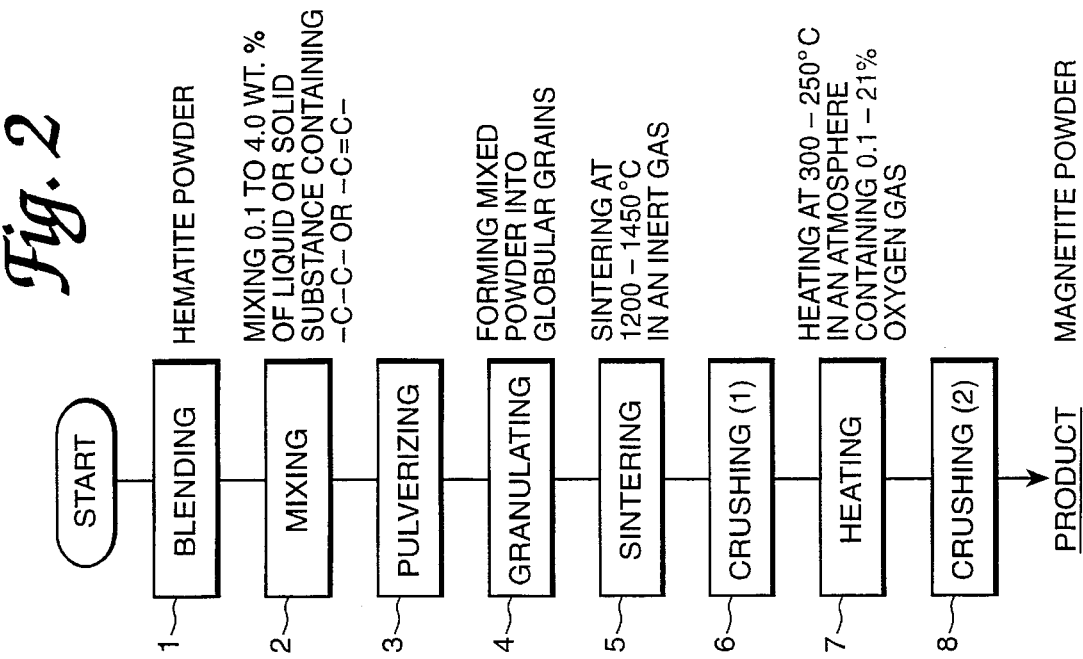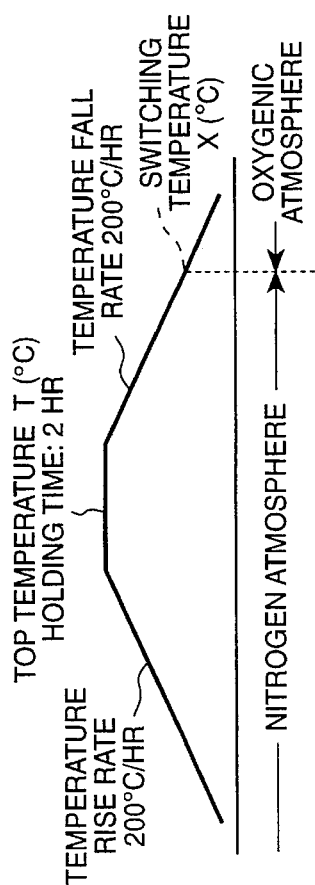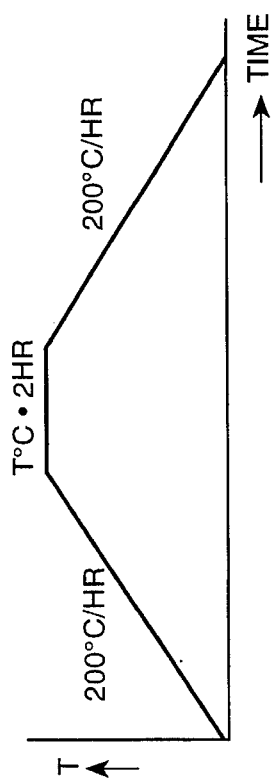

PROCESS FOR PRODUCING SINGLE PHASE MAGNETITE POWDER

TECHNICAL FIELD

The present invention relates to a process for producing single phase magnetite powder suitable for use in a wide range of technical fields, e.g., those of toners and carriers for electrophotography, electric resistance elements and magnetic fluids.

In the above process of the present invention, the single phase magnetite powder is produced by adding an organic substance, etc., to hematite powder and heating the mixture in an inert gas.

BACKGROUND ART

The following three general methods are known for producing magnetite, and it is known that they have respective drawbacks as described below.

(1) Wet process: an aqueous solution of $Fe^{2+} + 2\ Fe^{3+}$ is rendered alkaline and coprecipitated.

Drawbacks: production cost is high and it is not suitable for mass production, although fine particles each having a relatively high purity are readily obtained by coprecipitation.

(2) Dry process: hematite is heated in either hydrogen and carbon monoxide or steam to thereby be reduced.

Drawbacks: the reaction is performed in a relatively highly reducing atmosphere, e.g., either high pressure steam or hydrogen and carbon monoxide, so that danger accompanies the mass production, and large scale equipment is required.

(3) Process in which natural magnetite is pulverized.

Drawbacks: a natural mineral is used as a starting material, so that it is difficult to stably produce high quality powder for a prolonged period of time.

Taking into account the advantages and disadvantages of the above processes, various proposals have been made with respect to the production of magnetite powder for use in magnetic toners and carriers for electrophotography, etc.

For example, Japanese Patent Publication Nos. 238,580/1987, 39,498/1990 and 51,505/1990 disclose processes for producing magnetite useful as a carrier component of an electrophotographic developer, especially a two-component developer composed of a toner and a carrier. Each of these processes comprises providing magnetite powder (or globular magnetite particles) as a starting material, granulating the same into globular grains through, for example, mixing with a binder, followed by heating (sintering), and applying a resin coating to the resultant globular magnetite particles according to the conventional technique.

The use of a material called soft ferrite as carrier particles is known (U.S. Pat. No. 3,929,657, etc.). In this connection, it is known that the carrier particles each composed of the above ferrite not only are excellent in magnetic properties but also do not require a resin coating layer, so that their durability is excellent. Noting that ferrite particles have resistance variations depending on the control of sintering atmosphere, even with the same composition, attempts have been made to enlarge resistance variation ranges by changing the sintering atmosphere. As an example thereof, there can be mentioned an attempt described in Japanese Patent Publication No. 37782/1987. This comprises providing an Mg ferrite as a starting material and increasing the amount of ferric oxide ($Fe_2O_3$) to more than 53% by mole so as to enlarge its resistance variation range.

On the basis of the above prior art, the inventors have found a novel process for producing single phase magnetite as an oxidic magnetic material.

DISCLOSURE OF THE INVENTION

A primary object of the present invention is to provide a novel process for producing single phase magnetite as an oxidic magnetic material on the basis of the above prior art.

Another object of the present invention is to provide a process for producing single phase magnetite powder of high quality in a large amount, with less cost and safely by simple equipment and operation, as compared with the above conventional processes.

A further object of the present invention is to provide a process for mass-producing single phase magnetite powder of high quality and a desired electric resistance.

A still further object of the present invention is to provide a process for producing an oxidic magnetic material (magnetic oxide) having a desired electric resistance while retaining the properties characteristic of magnetite powder and arbitrarily regulating the conductivity of the base material of magnetite powder per se.

The present invention provides a process for producing single phase magnetite powder by adding an organic substance, etc., to hematite powder and heating the mixture in an inert gas. The thus produced single phase magnetite powder is not particularly limited in its application, and can widely be utilized in, for example, toners and carriers for electrophotography, electric resistance elements and magnetic fluids.

According to the present invention, there is provided a process for producing single phase magnetite powder, comprising adding 0.1 to 4.0% by weight of a liquid or powdery substance having a carbon-to-carbon single or double bond to hematite powder, stirring the mixture to obtain a substantially homogeneous mixture and heating the mixture in an inert gas at 1200° to 1450° C.

According to one working mode of the above process, prior to the heating in the inert gas, an organic binder is added to hematite powder and the resultant hematite powder is granulated into globular grains to thereby render the produced magnetite powder globular.

In another embodiment of the present invention, the oxygen concentration of the atmosphere may be regulated during a cooling subsequent to the above heating. In this embodiment, during the cooling, the temperature and the oxygen concentration may be regulated to 300° C. or below (preferably in the range of 250° to 300° C.) and 0.1 to 21% by volume, respectively, to thereby produce magnetite powder having a desired electric resistance.

In the present invention, the substance to be added to hematite powder may be one which has a carbon-to-carbon single or double bond and can be burned by supplying oxygen. Generally, use is made of, for example, organic substances, such as organic binders and dispersants, utilized in the granulating or the like. When granulation into globular grains is effected, the above organic binder is used. In this case, the organic binder not only functions as a binder during the granulation but also exhibits reducing activity during the heating. Also, use is made of acetylene black and graphite, etc. The reason for limiting the addition to the range of 0.1 to 4.0% by weight is that, at less than 0.1% by weight, the reducing effect of the addition of the substance is poor, and that, on the other hand, when the addition exceeds 4.0% by weight, not only is there no meaning in adding so much but also granulation, if performed, would not be successful. Moreover, when the addition is much greater than the upper limit, disadvantageously, foreign matters, such as carbon, formed by incomplete combustion of the organic substance would remain in the produced magnetite powder.

The reason for limiting the heating temperature (top temperature) to the range of 1200° to 1450° C. is that, at less than 1200° C., hematite ($\alpha$-$Fe_2O_3$) would remain, and that, on the other hand, when the temperature exceeds 1450° C., the phase of FeO would appear.

The reason for setting the lower limit of the oxygen concentration during the cooling at 0.1% in one embodiment of the present invention is that it is extremely difficult to realize the control at less than 0.1% during the mass-production. The reason for setting the switching temperature for feeding oxygen at 300° C. or below is that, when the switching temperature exceeds 300° C. at oxygen concentrations of 0.1% or greater, the phase of hematite would remain.

When a mixture of a metal oxide and an organic substance is heated in an inert gas, the metal oxide is reduced. For example, when propylene ($CH_3$—$CH$=$CH_2$) is used as the organic substance, the propylene is deprived of $H^+$ by the $O^{-2}$ of the metal oxide on the surface of the metal oxide, so that it is converted to a $\pi$ allyl intermediate. Substantially the same reaction occurs irrespective of the type of the organic substance. Either the above $\pi$ allyl intermediate is converted to acrolein with the addition of oxygen thereto, or two $\pi$ allyl intermediates mentioned above are dimerized to form benzene. In the above reaction, a carbon-to-carbon double bond is required for the conversion to the $\pi$ allyl intermediate. However, the carbon-to-carbon single bond is deprived of $H^+$ on the metal oxide to be converted to a double bond, so that the presence of only the carbon-to-carbon single bond will suffice in the initial stage. For example, although polyvinyl alcohol has no carbon-to-carbon double bond, it has satisfactory reducing activity.

When a mixture of hematite ($\alpha$-$Fe_2O_3$) and an organic substance is heated in an inert gas, the condition of incomplete combustion occurs, so that the hematite is deprived of oxygen at the time of thermal decomposition of the organic substance to thereby be reduced and thus undergoes a thermal transition to magnetite ($Fe_3O_4$) of single phase as observed by X-ray diffractometry (having a purity of nearly 100%). This reaction is extremely efficient. For example, even if hematite powder is packed in a sagger to form a layer having a thickness of several centimeters and fed into the conventional ferrite-producing equipment, the whole of the hematite powder is converted to desirable magnetite powder. That is, in the present invention, hematite powder is reduced by formed gas with a positive utilization of incomplete combustion of the organic substance, etc.

In contrast, in the heating of only hematite powder, without incorporation of any organic substance, in an inert gas, heating of a small amount of hematite powder thinly spread on the surface of a sagger for a prolonged period of time causes part of the hematite powder to be converted to magnetite powder, but the production efficiency is so low as to be unfit for industrialization.

The switching to an oxygenic atmosphere during the cooling subsequent to the heating causes the surface of the magnetite powder to be oxidized. However, this oxidation is so slight that only the magnetite phase is detected in a qualitative analysis by powder X-ray diffractometry, as long as the above requirement on oxygen concentration is satisfied. Thus, the magnetite powder can be regarded as having a single phase of magnetite. While the above modification of particle surface is only very slight, the above oxidation causes the electric resistance of the magnetite powder to increase by at least about two figures, so that the electrical characteristics thereof can be regulated to desired values.

BRIEF DESCRIPTION OF THE DRAWINGS

FIG. 1 is an explanatory view of a temperature control program to be executed in a heating treatment in the second embodiment of the present invention;

FIG. 2 is an explanatory view of the steps to be taken in the third embodiment of the present invention;

FIG. 3 is a view of an exemplary heating-cooling curve suitable for the third embodiment of the present invention.

BEST MODE FOR CARRYING OUT THE INVENTION

First Embodiment

Figure 4:
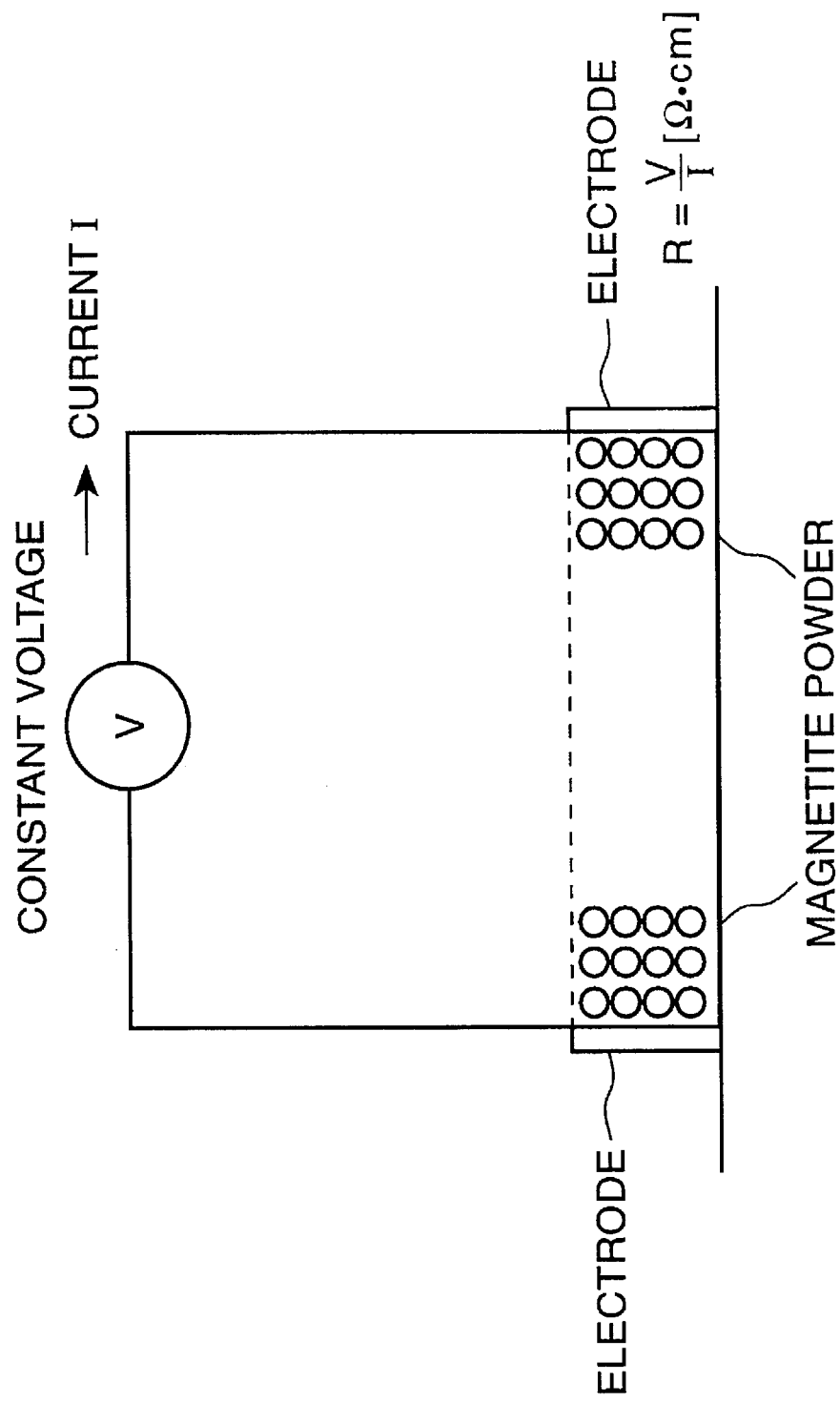
FIG. 4 is an explanatory view of the measurement of electric resistance conducted in the third embodiment of the present invention.

Preferred embodiments of the present invention will now be described with reference to the following Experimental Examples.

Experimental Example A

PVA (polyvinyl alcohol) and a polycarboxylate as a dispersant were added to hematite powder as a starting material in respective amounts of 0 to 3 and 1% by weight, and mixed with water. Thus, a slurry having a hematite concentration of 50% by weight was obtained. The slurry was agitated in an attritor for 1 hr, and granulated into globular grains by a spray dryer. The obtained grains were heated at 800° to 1500° C. in an atmosphere of nitrogen for 2 hr. After the heating, the identification of each phase was performed by powder X-ray diffractometry. Results are shown in Table 1.

TABLE 1

| Sample | Sample No. | Amt. of PVA added (% by weight) | Heating temp. (°C.) | Results of qual. anal. by powder X-ray diffractometry | | |
|---|---|---|---|---|---|---|
| | | | | $Fe_3O_4$ | $\alpha$-$Fe_2O_3$ | FeO |
| Comp. Ex. | 1 | 0 | 800 | — | o | — |
| Comp. Ex. | 2 | 0 | 1000 | — | o | — |
| Comp. Ex. | 3 | 0 | 1100 | — | o | — |
| Comp. Ex. | 4 | 0 | 1150 | o | o | — |
| Comp. Ex. | 5 | 0 | 1200 | o | o | — |
| Comp. Ex. | 6 | 0 | 1400 | o | o | — |
| Comp. Ex. | 7 | 0 | 1450 | o | o | — |
| Comp. Ex. | 8 | 0 | 1470 | o | — | o |
| Comp. Ex. | 9 | 2.0 | 800 | o | o | — |
| Comp. Ex. | 10 | 2.0 | 1000 | o | o | — |
| Comp. Ex. | 11 | 2.0 | 1100 | o | o | — |
| Comp. Ex. | 12 | 2.0 | 1150 | o | o | — |
| Invention | 13 | 2.0 | 1200 | o | — | — |
| Invention | 14 | 2.0 | 1400 | o | — | — |
| Invention | 15 | 2.0 | 1450 | o | — | — |
| Comp. Ex. | 16 | 2.0 | 1500 | o | — | o |
| Invention | 17 | 0.1 | 1300 | o | — | — |
| Invention | 18 | 0.2 | 1300 | o | — | — |
| Invention | 19 | 0.5 | 1300 | o | — | — |
| Invention | 20 | 1.0 | 1300 | o | — | — |
| Invention | 21 | 2.0 | 1300 | o | — | — |
| Invention | 22 | 3.0 | 1300 | o | — | — |

From the above results, the following has been found.

(1) From only hematite powder without the addition of PVA (Comparative Example), single phase magnetite cannot be obtained. The X-ray diffraction pattern shows the presence of the phase of hematite ($\alpha$-Fe$_2$O$_3$) or wustite (FeO).

(2) When the amount of PVA added was set at 2% by weight and the heating temperature was varied, single phase magnetite was obtained at heating temperatures ranging from 1200° to 1450° C., but $\alpha$-Fe$_2$O$_3$ was coexistent at heating temperatures of 1150° C. or below and FeO was coexistent at heating temperatures of 1500° C. or above.

Therefore, it is requisite that the heating temperature be in the range of 1200° to 1450° C.

(3) At a heating temperature of 1300° C., the amount of PVA added was varied between 0.1 and 3.0% by weight. In any case, single phase magnetite was obtained. That is, PVA can be added in an amount of 0.1% by weight or greater.

Experimental Example B

Each of the additives, i.e., polyvinyl alcohol, polyacrylamide, polyisobutylene, a polycarboxylate and an alkylnaphthalenesulfonate (the above being added in the form of an aqueous solution), polyvinyl butyral and stearic acid (the above being added in the form of an alcoholic solution or dispersion), and acetylene black and graphite (the above being added in the form of powder, followed by addition of an alcohol, and mixed) was added to hematite powder as a starting material in an amount of 2% by weight. The mixture was mixed in a mortar, and sifted through a 425-μm-mesh sieve to render particle sizes uniform. The resultant particles were dried at 60° C. for about 4 hr, and heated at 1200° C. for 2 hr in each of nitrogen, argon, helium and air. After the heating, the identification of the test materials was performed by a qualitative analysis using powder X-ray diffractometry. Results are shown in Table 2.

TABLE 2

| Sample | | | | Results of qual. anal. by powder X-ray diffractometry | | |
|---|---|---|---|---|---|---|
| | No. | Additive | Atmosphere | Fe$_3$O$_4$ | $\alpha$-Fe$_2$O$_3$ | FeO |
| Comp. Ex. | 1 | 0 | in N$_2$ | o | o | — |
| Invention | 2 | Polyvinyl Alcohol | in N$_2$ | o | — | — |
| Invention | 3 | Polyvinyl Alcohol | in Ar | o | — | — |
| Invention | 4 | Polyvinyl Alcohol | in He | o | — | — |
| Comp. Ex. | 5 | Polyvinyl Alcohol | in air | — | o | — |
| Invention | 6 | Polyvinyl butyral | in N$_2$ | o | — | — |
| Invention | 7 | Polyvinyl butyral | in Ar | o | — | — |
| Invention | 8 | Polyvinyl butyral | in He | o | — | — |
| Comp. Ex. | 9 | Polyvinyl butyral | in air | — | o | — |
| Invention | 10 | Polyacrylamide | in N$_2$ | o | — | — |
| Invention | 11 | Polyacrylamide | in Ar | o | — | — |
| Invention | 12 | Polyacrylamide | in He | o | — | — |
| Comp. Ex. | 13 | Polyacrylamide | in air | — | o | — |
| Invention | 14 | Polyisobutylene | in N$_2$ | o | — | — |
| Invention | 15 | Polyisobutylene | in Ar | o | — | — |
| Invention | 16 | Polyisobutylene | in He | o | — | — |
| Comp. Ex. | 17 | Polyisobutylene | in air | — | o | — |
| Invention | 18 | Polycarboxylate | in N$_2$ | o | — | — |
| Invention | 19 | Polycarboxylate | in Ar | o | — | — |
| Invention | 20 | Polycarboxylate | in He | o | — | — |
| Comp. Ex. | 21 | Polycarboxylate | in air | — | o | — |
| Invention | 22 | Alkylnaphthalenesulfonate | in N$_2$ | o | — | — |
| Invention | 23 | Alkylnaphthalenesulfonate | in Ar | o | — | — |
| Invention | 24 | Alkylnaphthalenesulfonate | in He | o | — | — |
| Comp. Ex. | 25 | Alkylnaphthalenesulfonate | in air | — | o | — |
| Invention | 26 | Stearic acid | in N$_2$ | o | — | — |
| Invention | 27 | Stearic acid | in Ar | o | — | — |
| Invention | 28 | Stearic acid | in He | o | — | — |
| Comp. Ex. | 29 | Stearic acid | in air | — | o | — |
| Invention | 30 | Acetylene black | in N$_2$ | o | — | — |
| Invention | 31 | Acetylene black | in Ar | o | — | — |
| Invention | 32 | Acetylene black | in He | o | — | — |
| Comp. Ex. | 33 | Acetylene black | in air | — | o | — |
| Invention | 34 | Graphite | in N$_2$ | o | — | — |
| Invention | 35 | Graphite | in Ar | o | — | — |
| Invention | 36 | Graphite | in He | o | — | — |
| Comp. Ex. | 37 | Graphite | in air | — | o | — |

Irrespective of the type of the additive, similar results were obtained. More specifically, with respect to all of the materials, single phase magnetite was obtained by the heating in each of nitrogen, argon and helium, but the heating in air led to a product entirely composed of hematite ($\alpha$-Fe$_2$O$_3$). Namely, single phase magnetite was not obtained in the atmosphere containing oxygen in a large proportion, such as air.

Experimental Example C

Now, the relationship between the heating temperature and the holding time will be described. An experiment was made to answer the question whether, as long as the holding time is satisfactorily long, the reduction would proceed even in the absence of an organic substance to thereby produce single phase magnetite powder. First, only hematite powder having no organic substance, etc., added thereto was held in an atmosphere of nitrogen at 1200° C. for 10 hr. A qualitative analysis using powder X-ray diffractometry as mentioned above showed the coexistence of the phase of hematite ($\alpha$-$Fe_2O_3$). Next, hematite powder having 2% by weight of PVA added thereto was held in an atmosphere of nitrogen at 1100° C. for 10 hr. Similarly, the coexistence of the phase of hematite ($\alpha$-$Fe_2O_3$) was confirmed. In both of the above cases, single phase magnetite powder was not obtained.

As described above, the present invention provides a process comprising adding an appropriate amount of an organic substance, etc., to hematite powder and heating the mixture in an inert gas. By this process, single phase magnetite powder of high quality can easily be produced with less cost. Further, the production efficiency of the process is extremely high because the conventional equipment for producing ferrite can be utilized and because a large volume of hematite powder can be fed into one sagger for processing.

Second Embodiment

Experimental Example D

PVA (polyvinyl alcohol) and a polycarboxylate as a dispersant were added to hematite powder as a starting material in respective amounts of 2 and 1% by weight, and mixed with water. Thus, a slurry having a hematite concentration of 50% by weight was obtained. The slurry was agitated in an attritor for 1 hr, and granulated into grains by a spray dryer. The obtained grains were heated at 1200° to 1400° C. (top temperature) in an atmosphere of nitrogen for 2 hr. Part of the grains were cooled in the same atmosphere of nitrogen, and part of the grains were subjected to a cooling during which the atmosphere of nitrogen was switched to an oxygenic atmosphere at a given temperature. The temperature control program for the above thermal treatment is shown in FIG. 1. The oxygen concentration of the atmospheric gas was measured by the zirconia oxygen concentration meter. The electric resistance of each of the magnetite powder materials after the thermal treatment was measured in accordance with the method described in Japanese Patent Laid-Open No. 11217/1189. With respect to all of the magnetite powder materials, the measurement of the electric resistance was performed within 2 hr of the thermal treatment because of the high susceptivity of the electric resistance to the influence of ambient humidity. The identification of the phase of each of the magnetite powder materials was performed by a qualitative analysis using powder X-ray diffractometry. Results are shown in Table 3.

TABLE 3

| Sample | No. | Heating temp. (°C.) | Switching temp. (°C.) | Concn. of oxygen in atmosphere after switching | Elec. resistance ($\Omega \cdot$ cm) | Results of qual. anal. by powder X-ray diffractometry | | |
|---|---|---|---|---|---|---|---|---|
| | | | | | | $Fe_3O_4$ | $\alpha$-$Fe_2O_3$ | FeO |
| Comp. Ex. | 1 | 1200 | — | — | $1.5 \times 10^4$ | o | — | — |
| Comp. Ex. | 2 | 1300 | — | — | $2.0 \times 10^4$ | o | — | — |
| Comp. Ex. | 3 | 1400 | — | — | $1.5 \times 10^4$ | o | — | — |
| Comp. Ex. | 4 | 1300 | 350 | 0.1% | $1.5 \times 10^9$ | o | o | — |
| Invention | 5 | 1300 | 300 | 0.1% | $1.5 \times 10^6$ | o | — | — |
| Invention | 6 | 1300 | 300 | 0.2% | $2.0 \times 10^6$ | o | — | — |
| Invention | 7 | 1300 | 300 | 2.0% | $2.1 \times 10^6$ | o | — | — |
| Invention | 8 | 1300 | 300 | 21% | $6.4 \times 10^6$ | o | — | — |
| Invention | 9 | 1300 | 250 | 0.1% | $1.2 \times 10^6$ | o | — | — |
| Invention | 10 | 1300 | 250 | 0.2% | $2.1 \times 10^6$ | o | — | — |
| Invention | 11 | 1300 | 250 | 2.0% | $3.0 \times 10^6$ | o | — | — |
| Invention | 12 | 1300 | 250 | 21% | $5.8 \times 10^6$ | o | — | — |

The following has been found from the above results of Table 3.

(1) The materials obtained by cooling in the atmosphere of nitrogen to the last without the switching of the atmosphere to an oxygenic atmosphere during the cooling (Comparative Example) are each composed of single phase magnetite, but their electric resistances are all about 1.5 to $2.0 \times 10^4$ $\Omega$cm irrespective of the heating temperature.

(2) When the switching of the atmosphere during the cooling is carried out at 350° C., the resultant material exhibits a markedly high electric resistance, but the hematite phase remains even when the oxygen concentration is 0.1% and single phase magnetite powder cannot be obtained.

(3) Even when the temperature at which the atmosphere is switched is constant, the greater the oxygen concentration, the higher the electric resistance. At the same oxygen concentrations, the higher the temperature at which the atmosphere is switched, the higher the electric resistance. When the switching temperature is 300° C. or below, the hematite phase is not present even with cooling in air.

(4) The electric resistance can arbitrarily be adjusted within the range of $1.5 \times 10^4$ to $6.4 \times 10^6$ $\Omega$cm by controlling the atmosphere switching during the cooling and the oxygen concentration thereat.

In this embodiment, polyvinyl alcohol was used as the additive. This is not limitative, and the various organic substances set forth in the above Example B can be used.

In the embodiment of the present invention described in the Example D, the process was adopted in which the atmosphere was switched at a given temperature during the cooling to an atmosphere having a given oxygen concentration. Thus, substantially single phase magnetite powder can be produced and the electric resistance thereof can easily be adjusted to a desired value by regulating the oxygen concentration and the switching temperature.

Third Embodiment

The third embodiment of the present invention will be described referring to FIG. 2.

In the blending step 1 in FIG. 2, hematite powder having a given average particle size (e.g., 1 μm) is blended with various additives according to necessity.

In the mixing step 2, the hematite powder blend is mixed with 0.1 to 4.0% by weight of a liquid or solid compound having —C—C— or —C=C— in its molecules (i.e., substance having a carbon-to-carbon single or double bond. For example, 2% by weight of polyvinyl alcohol and 1% by weight of a polycarboxylate as a dispersant are added to hematite powder, and further water is added for granulation into globular grains. The amount of water added is in the range of 30 to 70% by weight. When the amount of water was less than 30% by weight, the viscosity of a slurry obtained by milling was too high to be granulated into globular grains. On the other hand, when the amount of water exceeded 70% by weight, the slurry concentration was too low to be granulated into dense globular grains.

In the crushing step 3, the mixture obtained in the mixing step 2 is wetly crushed in an attrition mill to thereby prepare a slurry having a hematite concentration of about 50% by weight.

In the granulating step 4, globular grains are formed. In this step, the slurry is agitated in an attritor for 1 hr, and subjected to hot-air drying by an spray dryer to obtain globular grains.

In the sintering step 5, the grains obtained in the granulating step 4 are heated at 1200° to 1450° C. in an inert gas (e.g., in nitrogen gas) for 2 hr to thereby obtain single phase magnetite powder. In this step, not only is the thermal transition from hematite to magnetite effected in the inert gas (in weakly reducing atmosphere) but also the organic substance mixed with the hematite powder is brought by the heating in the inert gas into the state of incomplete combustion, in which the hematite is deprived of oxygen during the thermal decomposition of the organic substance to thereby be reduced to markedly promote the conversion to magnetite.

In the crushing step 6, a first crushing is performed. In this step, the grains mutually adhering as a result of the heating in the sintering step 5 are separated.

In the heating step 7, the formed single phase magnetite powder is heated at 250° to 300° C. in an atmosphere having an oxygen concentration of 0.1 to 21% (oxygen concentration in air) to oxidize a thin surface part of the magnetite powder. Thus, the electric resistance of the magnetite powder can be regulated (see experimental results on the electric resistances in Table 5).

In the second crushing step 8, the resintered magnetite powder in which hematite may be coexistent is crushed to obtain a final product.

Experimental Example E

Results of the sintering experiment according to the above third embodiment are shown in Table 4. PVA (polyvinyl alcohol) was added in an amount specified in the Table to hematite powder, and further 1% by weight of a polycarboxylate as a dispersant and water were added and mixed. The mixture was granulated and sintered at a temperature specified in the Table. After the sintering, a qualitative analysis by powder X-ray diffractometry was conducted. Results are shown in the Table. As in the foregoing Experimental Examples, the Comparative Example is the one for comparison purposes, and the Example is the one according to the above third embodiment of the present invention. From this Experimental Example, the following has been found.

(1) No single phase magnetite was obtained even with the changed heating temperatures from only hematite powder having no PVA added thereto (Sample Nos. 1 to 8). The X-ray diffractometry showed the presence of the phase of hematite $\alpha$-$Fe_2O_3$ or wustite FeO.

(2) When the amount of PVA added was set at 2% by weight and the heating temperature was varied, single phase magnetite was obtained at heating temperatures ranging from 1200° to 1450° C. (Sample Nos. 13 and 14), but $\alpha$-$Fe_2O_3$ was coexistent at heating temperatures of 1150° C. or below (Sample Nos. 9 to 12), and FeO was coexistent at heating temperatures of 1500° C. or above (Sample No. 16). Therefore, it is requisite that the heating temperature be in the range of 1200° to 1450° C. (Sample Nos. 13–15).

TABLE 4

| Sample | Sample No. | Amt. of PVA added (% by weight) | Heating temp. (°C.) | Results of qual. anal. by powder X-ray diffractometry | | |
|---|---|---|---|---|---|---|
| | | | | $Fe_3O_4$ | $\alpha$-$Fe_2O_3$ | FeO |
| Comp. Ex. | 1 | 0 | 800 | — | o | — |
| Comp. Ex. | 2 | 0 | 1000 | — | o | — |
| Comp. Ex. | 3 | 0 | 1100 | — | o | — |
| Comp. Ex. | 4 | 0 | 1150 | o | o | — |
| Comp. Ex. | 5 | 0 | 1200 | o | o | — |
| Comp. Ex. | 6 | 0 | 1400 | o | o | — |
| Comp. Ex. | 7 | 0 | 1450 | o | o | — |
| Comp. Ex. | 8 | 0 | 1470 | o | — | o |
| Comp. Ex. | 9 | 2.0 | 800 | o | o | — |
| Comp. Ex. | 10 | 2.0 | 1000 | o | o | — |
| Comp. Ex. | 11 | 2.0 | 1100 | o | o | — |
| Comp. Ex. | 12 | 2.0 | 1150 | o | o | — |
| Invention | 13 | 2.0 | 1200 | o | — | — |
| Invention | 14 | 2.0 | 1400 | o | — | — |
| Invention | 15 | 2.0 | 1450 | o | — | — |
| Comp. Ex. | 16 | 2.0 | 1500 | o | — | o |
| Invention | 17 | 0.1 | 1300 | o | — | — |
| Invention | 18 | 0.2 | 1300 | o | — | — |
| Invention | 19 | 0.5 | 1300 | o | — | — |
| Invention | 20 | 1.0 | 1300 | o | — | — |
| Invention | 21 | 2.0 | 1300 | o | — | — |
| Invention | 22 | 3.0 | 1300 | o | — | — |

(3) At a heating temperature of 1300° C., the amount of PVA added was varied between 0.1 and 3.0% by weight. In any case, single phase magnetite was obtained (Sample Nos. 17 to 22).

From the above results, it has been found that completely single phase magnetite can be obtained whenever PVA is added to hematite powder in an amount of 0.1 to 3% by weight (4% by weight) and whenever the sintering is performed by heating at 1200° to 1450° C.

Experimental Example F

Results of the electric resistance experiments according to the above embodiment are shown in Table 5. More specifically, single phase magnetite powder obtained by sintering under the conditions specified in the sintering experiment results of Table 4 was heated at a temperature and in an oxygenic atmosphere both specified in Table 5, and the electric resistance of the resultant magnetite powder was measured (see FIG. 4). The measurement of the electric resistance of the magnetite powder was performed in a thermohygrostatic environment (22° C., 55±3% R.H.) in view of the high susceptivity thereof to the influence of the ambient humidity. The concentration of oxygen in the gas was measured by the use of the zirconia oxygen concentration meter.

(1) When the above heating was not conducted (Sample No. 1), the electric resistance of the magnetite powder was 2.5E8 $\Omega$cm. Herein, 2.5E8 means $2.5 \times 10^8$.

(2) In the atmosphere containing 21% $O_2$ (concentration of oxygen in air), the heating at 250° to 300° C. gave magnetite powder which exhibited an electric resistance of about 2.5E9 as indicated in Table 5, i.e., greater than that exhibited when the heating was not conducted as in item (1) above by one figure, and which had its surface part very thinly oxidized but was found to be in a single phase by X-ray diffractometry.

(3) In the atmosphere containing 2.0% $O_2$ (concentration of oxygen in air), the heating at 250° to 300° C. as in item (2) above gave magnetite powder which exhibited an electric resistance of 2.5E9 to 3.0E9 as indicated in Table 5, i.e., greater than that exhibited when the heating was not conducted as in item (1) above by one figure, and which had its surface part very thinly oxidized but was found to be in a single phase by X-ray diffractometry.

(4) In the atmosphere containing 0.2% $O_2$ (concentration of oxygen in air), the heating at 250° to 300° C. as in item (2) above gave magnetite powder which exhibited an electric resistance of 2.6E9 to 2.9E9 as indicated in Table 5, i.e., greater than that exhibited when the heating was not conducted as in item (1) above by one figure, and which had its surface part very thinly oxidized but was found to be in a single phase by X-ray diffractometry.

From the above results, it has been found that magnetite powder exhibiting an arbitrary electric resistance, found to be in a single phase by X-ray diffractometry, can be produced by heating the single phase magnetite powder obtained by the sintering experiment as indicated in Table 4 at 250° to 300° C. in an atmosphere containing an oxygen gas in a concentration of 0.2 (0.1%) to 21% (concentration of oxygen in air) to thereby oxidize the surface thereof.

FIG. 3 illustrates a heating-cooling curve suitable for the above embodiment of the present invention. The curve shows an exemplary course of heating in which the heating is conducted at T° C. indicated as heating temperature in Table 5 for 2 hr. In particular, the heating is so performed that the temperature is elevated at a rate of 200° C./hr from room temperature to T°C., which is held for 2 hr. Thereafter, the temperature is lowered to room temperature at a rate of 200° C./hr. Herein, T°C. is the heating temperature indicated in Table 5. Generally, the heating is at all times performed in the unchanged atmosphere. However, an oxygen gas may be introduced in a given concentration during the cooling period from 300° to 250° C. Moreover, when the temperature has reached 300° to 250° C. during the cooling period, the cooling may be interrupted, followed by the holding of the temperature for a given period of time (e.g., 1 hr) and the resuming of the cooling.

TABLE 5

|  | Sample No. | Heating temp. (°C.) | Atmosphere | Elec. resistance ($\Omega \cdot cm$) | Results of qual. anal. by powder X-ray diffractometry | |
|---|---|---|---|---|---|---|
|  |  |  |  |  | $Fe_3O_4$ | $Fe_2O_3$ |
| Comp. Ex. | 1 | — | — | 2.5E8 | o | — |
| Comp. Ex. | 2 | 200 | 21.0% $O_2$ | 4.2E8 | o | — |
| Invention | 3 | 250 | 21.0% $O_2$ | 2.5E9 | o | — |
| Invention | 4 | 300 | 21.0% $O_2$ | 2.5E9 | o | — |
| Comp. Ex. | 5 | 350 | 21.0% $O_2$ | 3.0E9 | o | o |
| Comp. Ex. | 6 | 200 | 2.0% $O_2$ | 1.0E8 | o | — |
| Invention | 7 | 250 | 2.0% $O_2$ | 2.5E9 | o | — |
| Invention | 8 | 300 | 2.0% $O_2$ | 2.8E9 | o | — |
| Comp. Ex. | 9 | 350 | 2.0% $O_2$ | 3.0E9 | o | o |
| Comp. Ex. | 10 | 200 | 0.2% $O_2$ | 2.0E8 | o | — |
| Invention | 11 | 250 | 0.2% $O_2$ | 2.6E9 | o | — |
| Invention | 12 | 300 | 0.2% $O_2$ | 2.9E9 | o | — |
| Comp. Ex. | 13 | 350 | 0.2% $O_2$ | 3.2E9 | o | o |

FIG. 4 is an explanatory view for the measurement of electric resistance as conducted in the above embodiment, i.e., for the measurement of electric resistance shown in Table 5. The electric resistance is determined by interposing the magnetite powder between electrodes, applying a constant voltage V to the terminal electrodes, measuring the current I flowing through the circuit, and calculating according to the formula:

$$R=V/I \; [\Omega cm]$$

wherein the electric resistance is a value per area.

As described above, hematite powder is mixed with a substance having a carbon-to-carbon single or double bond, sintered to form magnetite, and heated in a given oxygenic atmosphere. Thus, magnetite powder having a desired electric resistance can easily be mass-produced without detriment to the properties such as saturation magnetization. In particular, magnetite powder (oxidic magnetic material) having an arbitrary electric resistance can easily be produced with less cost by converting at one time a large amount of hematite powder to single phase magnetite powder in the sintering step 5 and oxidizing an extremely thin surface part of the magnetite powder in an oxygenic atmosphere in the heating step 7 (or in the cooling step subsequent to the above heating step).

We claim:

1. A process for producing single phase magnetite powder, comprising adding 0.1 to 4.0% by weight of a liquid or powdered substance having a carbon-to-carbon single or double bond to hematite powder, stirring the mixture to obtain a substantially homogeneous mixture, and heating the mixture in an inert gas at 1200° to 450° C.

2. The process according to claim 1, wherein said liquid or powdery substance is an organic binder.

3. The process according to claim 2, wherein, prior to said heating in the inert gas, said hematite powder having the organic binder added thereto is granulated into globular grains to thereby render the produced magnetite powder globular.

4. A process for producing single phase magnetite powder, comprising adding 0.1 to 4.0% by weight of a liquid or powdered substance having a carbon-to-carbon single or double bond to hematite powder, stirring the mixture to obtain a substantially homogeneous mixture, and heating the mixture in an inert gas at 1200° to 1450° C. wherein, after said heating, cooling is performed at a temperature regulated to 300° C. or below, wherein during said cooling step an atmosphere having an oxygen concentration regulated to 0.1 to 21% by weight is provided to thereby cause the magnetite powder to have a desired electric resistance.

5. A process for producing single phase magnetite powder, comprising adding 0.1 to 4.0% by weight of a liquid or powdered substance having a carbon-to-carbon single or double bond to hematite powder, stirring the mixture to obtain a substantially homogeneous mixture, and heating the mixture in an inert gas at 1200° to 1450° C. wherein, after said heating in the inert gas, the resultant magnetite powder is subjected to a second heating in an atmosphere having an oxygen concentration of 0.1 to 21% by weight at 250° to 300° C.

* * * * *